United States Patent [19]

Ekberg et al.

[11] Patent Number: 5,178,777
[45] Date of Patent: Jan. 12, 1993

[54] METHOD FOR REMOVING A FILTER CAKE

[75] Inventors: Bjarne S. L. Ekberg, Raisio; Jan O. M. Högnabba; Marti A. Sointusalo, both of Turku, all of Finland

[73] Assignee: Outomec Oy, Espoo, Finland

[21] Appl. No.: 793,867

[22] Filed: Nov. 18, 1991

[30] Foreign Application Priority Data

Nov. 19, 1990 [FI] Finland .................. 905694

[51] Int. Cl.$^5$ .............................. B01D 24/46
[52] U.S. Cl. .................. 210/798; 210/791; 210/797
[58] Field of Search ............. 210/798, 791, 797, 108, 210/408, 409, 333.01, 333.1, 682, 636, 327; 34/9; 44/490

[56] References Cited

U.S. PATENT DOCUMENTS

| | | | |
|---|---|---|---|
| 4,357,758 | 11/1982 | Lampinen | 44/490 |
| 4,404,106 | 9/1983 | Müller et al. | 210/797 |
| 4,552,669 | 11/1985 | Sekellick | 210/798 |
| 4,931,186 | 6/1990 | Ford et al. | 210/798 |
| 5,062,968 | 11/1991 | Warning | 210/798 |

FOREIGN PATENT DOCUMENTS 3905113  8/1990  Netherlands ............... 210/797

*Primary Examiner*—Robert A. Dawson
*Assistant Examiner*—Ana M. Fortuna
*Attorney, Agent, or Firm*—Brooks Haidt Haffner & Delahunty

[57] ABSTRACT

The invention relates to a method for removing a filter cake from a liquid-saturated suction surface, when the liquid in the creation of the filter cake is sucked through the filter surface of the filter element. According to the invention, on the filter surface of the filter element (1) there is formed a liquid film (3) by means of reversed pressure effected through the filter element (1). Essentially immediately after the creation of the liquid film, at least one gas blowing is directed to the filter surface of the filter element (1) in order to detach the filter cake (2) located on the filter surface.

8 Claims, 1 Drawing Sheet

METHOD FOR REMOVING A FILTER CAKE

The present invention relates to a method for removing a filter cake from a liquid-saturated suction surface.

From the U.S. Pat. No. 4,357,758 there is known a method for drying pulverous material, in which method the material to be dried is, by intermediation of a finely porous liquid-saturated suction surface, put into hydraulic contact with a liquid which is subjected to underpressure with respect to the material to be dried. In this drying method, the pressure difference between the gas and the liquid is adjusted to be such that the gas cannot penetrate the suction surface.

The FI patent 77,161 specifies a suction drier employing the above described drying method, which suction drier comprises one or several filter plates. In addition to this, the suction drier comprises a slurry tank provided with one or several rotating disc-like members. These disc-like members contain filter plates, on the surfaces whereof the filter cakes are accumulated and dried owing to the suction flow passing through the filter plates. The filter cake is detached from the surface of the filter plate by using a special molder.

While using a mechanical molder in the removal of the filter cake, part of the cake remains in between the molder and the filter surface. Consequently this part is not removed from the filter surface of the filter element in connection with molding. This is a problem particularly in applications where the cake is very thin. In those cases mechanical molding does not lead to a desirable result.

The object of the present invention is to eliminate some of the drawbacks of the prior art, and to achieve an improved method for removing a filter cake from off the filter surface of a suction drier, in which method the filter cake is removed along the filter surface of the filter element.

In order to create the filter cake on the filter surface of the filter element, and in order to apply the method of the invention, the filter material present in the slurry is first subjected to a pressure difference, owing to which the liquid is squeezed through the wall to inside the plate, and a solid cake is formed on the surface of the filter element. After the cake is created, the filter element containing the filter surface is removed from the slurry, and the drying period of the filter cake begins; during this period, excessive liquid is removed from the pores of the cake.

In the method of the invention, the filter cake is not scraped off in the stage of removal, but the cake is detached by means of the combined effect of gas blowing and reversed liquid pressure. According to the invention, the reversed liquid pressure zone is advantageously timed so that from inside the filter element, filter liquid is squeezed to in between the filter surface and the filter cake, essentially immediately before the gas blowing. Now a thin liquid film is created underneath the filter cake, and owing to this film, the friction between the filter cake and the filter surface is extremely slight, and the filter cake is detached by gas blowing with an essentially low power. Thus the filter surface is at the same time cleaned due to the liquid film, and a separate washing step for cleaning the filter element is not necessarily needed.

In the method of the invention, the timing of the gas blowing is of utmost importance. The gas blowing must take place essentially immediately after the filter surface is wetted. Moreover, this liquid film must be as thin as possible, in order to avoid unnecessary re-wetting of the cake. The gas blowing is advantageously carried out by means of at least one nozzle, which is advantageously placed at the inner edge of the filter element, when seen from the direction of removal of the filter cake. This nozzle sprays an advantageously elliptical jet. The nozzle is directed, in an oblique position, towards the filter surface, so that there is formed an essentially covering, advantageously fan-shaped spray surface. Thus the filter cake is detached from the filter surface of the filter element and removed from the suction drier in an essentially smooth fashion, even in one piece.

In order to boost the removal of the filter cake, two gas blowings can be employed, in which case the nozzle of the first blowing is located at the inner edge of the filter element, when seen from the direction of removal of the filter cake, and this first nozzle detaches the filter cake from the filter surface. Essentially at the center point of the filter element, there is placed the nozzle of the second blowing, which ensures the removal of the filter cake and its discharge to outside the housing of the apparatus employing the method of the invention. In the method of the invention, one or several nozzles can be provided for each gas blowing stage. When using several nozzles, the nozzles are arranged, with respect to the filter element, so that they are located at essentially even intervals from each other, and directed towards one and the same groove apparent in the filter element, which groove is located at an essentially regular distance from the edge of the filter element.

An essentially punctual synchronization of the reversed liquid pressure and gas blowing employed in the method of the invention is achieved by means of an electronic control mechanism. The control mechanism sets the starting time and duration of the washing, advantageously carried out by means of reversed pressure, as well as the starting time and duration of the gas blowing or blowings. Owing to this cyclic operation, the gas consumption in the blowing also is kept advantageously low.

When using the method of the invention, the filter element is not in any stage in contact with any of the mechanical parts, wherefore the wearing of the filter element is advantageously avoided. At the same time the choking of the pores of the filter element is reduced, because the small particles contained in the filter cake are not mechanically pressed into the pores of the filter element, as may happen when molding is applied. Thus the working time and capacity of the filter element can be essentially extended, which brings an advantageous decrease in the operational costs of a suction drier using the filter cake removal method of the present invention. Moreover, the expenses caused by the wearing of the prior art molders are reduced when employing the filter cake removal method of the invention.

Furthermore, the filter cake removal method of the invention can also be used in applications where the filter cake is essentially thin. The productive capacity of an apparatus using the method is likewise increased even in the case of a thicker filter cake, because dried solids do not get back into circulation. In addition to this, the production of the filter element becomes easier and cheaper, because the thickness of the plates does not have to be exactly the same. This makes it even possible to completely give up the grinding of the filter elements, which in the methods of the prior art was absolutely necessary.

The invention is further explained with reference to the appended drawing, where FIG. 1 is a schematical side-view illustration of a preferred embodiment of the invention, seen in the stage of formation of the filter cake;

Figure 1:
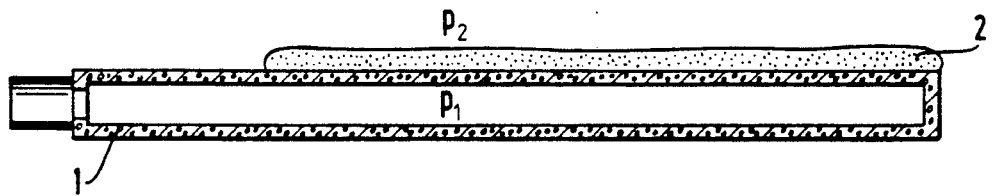

According to FIG. 1, on the filter surface of the filter element 1, there is formed a filter cake 2, when the pressure $p_2$ outside the filter element 1 is higher than the pressure $p_1$ of the filter element 1.

Figure 2:
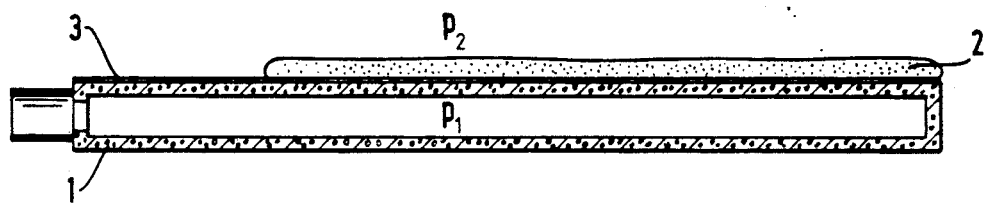
FIG. 2 is a schematical side-view illustration of the embodiment of FIG. 1, seen after the formation of the liquid film.

In FIG. 2, on the filter surface of the filter element 1, there is created a thin water film 3 with a thickness of 0.01–0.1 mm, advantageously 0.04–0.06 mm. The water film 3 is created so that by changing the pressure conditions between the filter element 1 and its surroundings (pressure $p_2$ is lower than pressure $p_1$), water is allowed to flow onto the filter surface for 0.1–0.3 s, depending on the desired thickness of the film.

Figure 3:
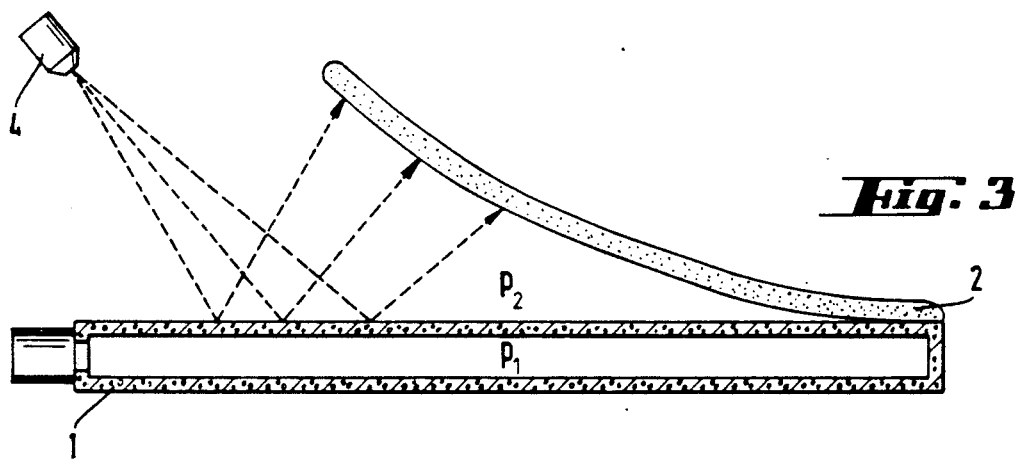
FIG. 3 is a schematical side-view illustration of the embodiment of FIG. 1, seen during the gas blowing.
Figure 4:
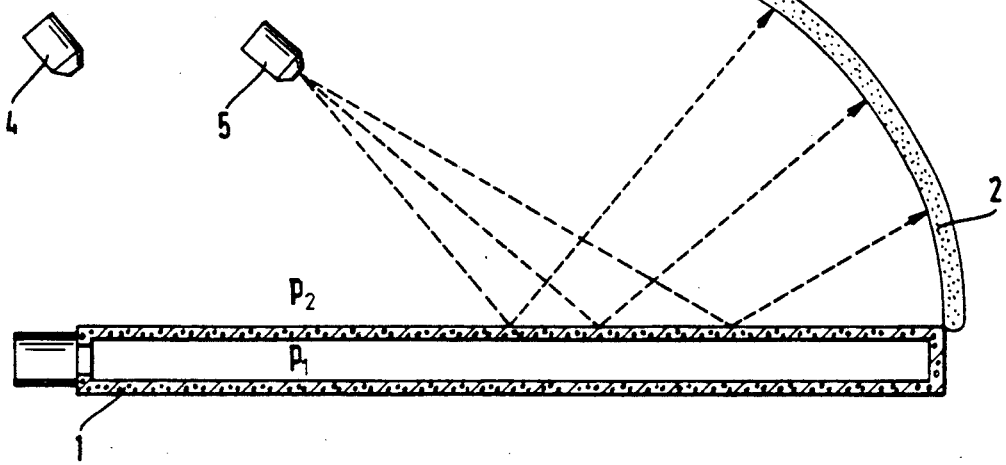
FIG. 4 is a schematical side-view illustration of another preferred embodiment of the invention, seen during a second gas blowing, when a two-step gas blowing is applied in the removal.

In the case of FIG. 3, pressurized air is blown onto the filter surface of the filter element 1 from an oblique direction; the duration of the blowing is advantageously between 0.5–1.0 s, during which time the filter cake 2, which was located on top of the water film 3, is detached from off the filter surface of the filter element 1. During the blowing of pressurized air, the pressures $p_2$ and $p_1$ are essentially maintained equally high. When it is desired to boost the pressurized air blowing, and consequently improve the removal of the filter cake 2 from off the filter surface of the filter element 1, it is possible, according to FIG. 4, to subject the filter surface, essentially immediately after the blowing from the nozzle 4, to another pressurized air blowing through the nozzle 5 with essentially the same duration as in the case of the first blowing; the nozzle 5 being located essentially near to the center part of the filter element 1. Now also the pressure $p_2$ can be raised to be higher than the pressure $p_1$, which is advantageous for the formation stage of the next filter cake 2.

We claim:

1. A method for removing a filter cake from a liquid-saturated suction surface in a process in which the filter cake is formed by sucking liquid through a filter surface of a filter element, comprising creating a liquid film on the filter surface of the filter element by reversing liquid pressure through the filter element, and essentially immediately after creating said liquid film, blowing gas from an oblique direction to the filter surface in order to detach the filter cake from the filter surface.

2. The method of claim 1 and including directing the gas through at least one nozzle provided at an inner edge of the filter element when viewed from the direction of filter cake removal.

3. The method of claim 1 wherein the gas blowing is carried out in two stages: first blowing gas through at least one nozzle located at an inner edge of the filter element when viewed from the direction of filter cake removal; then blowing gas through at least one nozzle located essentially at the center part of the filter element.

4. The method of any of claims 1–3 wherein said reversing of liquid pressure is effected by means of water which has been used in filtering.

5. The method of any of claims 1–3 wherein the thickness of the liquid film is 0.01–0.1 mm.

6. The method of any of claims 1–3 wherein the thickness of the liquid film is 0.04–0.06 mm.

7. The method of any of claims 1–3 wherein gas employed in the gas blowing is pressurized air.

8. The method of any of claims 1–3 wherein said gas blowing has a duration of 0.5–1.0 seconds.

* * * * *